(12) United States Patent
Bottomley (10) Patent No.: US 8,559,561 B2
(45) Date of Patent: Oct. 15, 2013

(54) METHOD AND APPARATUS FOR SYMBOL DETECTION VIA REDUCED COMPLEXITY SEQUENCE ESTIMATION PROCESSING

(75) Inventor: Gregory E. Bottomley, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1349 days.

(21) Appl. No.: 12/035,932

(22) Filed: Feb. 22, 2008

(65) Prior Publication Data

US 2009/0213908 A1 Aug. 27, 2009

(51) Int. Cl.
*H04L 27/00* (2006.01)

(52) U.S. Cl.
USPC ............ 375/324; 375/229; 375/340; 375/341

(58) Field of Classification Search
USPC .................. 375/229–233, 316, 324, 340, 341
See application file for complete search history.

(56) References Cited

U.S. PATENT DOCUMENTS

| | | | |
|---|---|---|---|
| 5,052,000 A * | 9/1991 | Wang et al. | 714/758 |
| 6,690,739 B1 * | 2/2004 | Mui | 375/265 |
| 6,925,127 B1 | 8/2005 | Dent | |
| 6,963,532 B1 | 11/2005 | Dent | |
| 7,266,146 B2 * | 9/2007 | Pare et al. | 375/232 |
| 7,277,515 B2 * | 10/2007 | Yen | 375/350 |
| 2003/0223489 A1 * | 12/2003 | Smee et al. | 375/233 |
| 2005/0201447 A1 | 9/2005 | Cairns et al. | |
| 2005/0201478 A1 | 9/2005 | Claussen et al. | |
| 2009/0110049 A1 * | 4/2009 | Luschi et al. | 375/233 |

FOREIGN PATENT DOCUMENTS

| | | |
|---|---|---|
| EP | 1331777 A1 | 7/2003 |
| EP | 1605600 A1 | 12/2005 |
| WO | 02/080480 A1 | 10/2002 |
| WO | 2005/096517 A1 | 10/2005 |

OTHER PUBLICATIONS

Ghaffar, R. et al. "Interference Suppression for Next Generation Wireless Systems." IEEE 69th Vehicular Technology Conference, 2009 (VTC Spring 2009), Apr. 26-29, 2009, Barcelona, Spain, pp. 1-5.
Balakrishnan, J. et al. "Time-Reversal Diversity in Decision Feedback Equalization." Proc. Allerton Conf. on Communication, Control and Computing. Monticello, IL, USA, Oct. 2000.
Co-peding U.S. Appl. No. 11/566,756, filed Dec. 5, 2006.
Co-pending U.S. Appl. No. 11/935,840, filed Nov. 6, 2007.
Choi, J. et al. "Receivers with Chip-Level Decision Feedback Equalizer for CDMA Downlink Channels." IEEE Transactions on Wireless Communications, vol. 3, No. 1, Jan. 2004, pp. 300-314.
Duel-Hallen, A. "Decorrelating Decision-Feedback Multliuser Detector for Synchronous Code-Division Multiple-Access Channel." IEEE Transactions on Comunications, vol. 41, No. 2, Feb. 1993, pp. 285-290.

(Continued)

*Primary Examiner* — Chieh M Fan
*Assistant Examiner* — Freshteh N Aghdam
(74) *Attorney, Agent, or Firm* — Coats and Bennett PLLC (57) ABSTRACT

Teachings presented herein offer the performance advantages of sequence estimation for received signal symbol detection, while simultaneously providing potentially significant reductions in computational overhead. Initial demodulation of a received signal identifies a reduced number of candidate symbol values for all or a subset of a sequence of symbols represented in a received signal. A sequence estimation process, e.g., an MLSE process, constrains its state spaces to the reduced number of candidate symbols values, rather than considering all possible symbol values.

20 Claims, 7 Drawing Sheets

(56) References Cited

OTHER PUBLICATIONS

Grant, S. J. et al. "Generalized Rake Receivers for MIMO Systems." 2003 IEEE 58th Vehicular Technology Conference, vol. 1, Oct. 6-9, 2003, pp. 424-428.

Klein, A. et al. "Zero Forcing and Minimum Mean-Square-Error Equalization for Multiuser Detection in Code-Division Multiple-Access Channels." IEEE Transactions on Vehicular Techonology, vol. 45, No. 2, May 1996, pp. 276-287.

Mailaender, L. "Linear MIMO Equalization for CDMA Downlink Signals with Code Reuse." IEEE Transactions on Wireless Communication, vol. 4, No. 5, Sep. 2005, pp. 2423-2434.

Nelson, J. K. et al. "Bad: Bidirectional Arbitrated Decision-Feedback Equalization." IEEE Transactions on Communications, vol. 53, No. 2, Feb. 2005, pp. 214-218.

Tang, X. et al. "Contradictory Block Arbitration for Bi-directional Decision Feedback Equalizers." Proc. IEEE Globecom, Nov. 17-21, 2002, pp. 283-286.

Varanasi, M. K. "Parallel Group Detection for Synchronous CDMA Communication Over Frequency-Selective Rayleigh Fading Channels." IEEE Transactions on Information Theory, vol. 42, No. 1, Jan. 1996, pp. 116-128.

Xie, Z. et al. "A Family of Suboptimum Detectors for Coherent Multiuser Communications." IEEE Journal on Selected Areas in Communications, vol. 8, No. 4, May 1990, pp. 683-690.

Williamson, D. et al. "Block Decision Feedback Equalization." IEEE Transactions on Communications, vol. 40, No. 2, Feb. 1992, pp. 255-264.

Bottomley, G. et al. "A Generalized Rake Receiver for Interference Suppression." IEEE Journal on Selected Areas in Communications, vol. 18, No. 8, Aug. 2000, pp. 1536-1545.

Wang, Y.P. E. et al. "DS-CDMA Downlink System Capacity Enhancement through Interference Suppression." IEEE Transactions on Wireless Communications, vol. 5, No. 7, Jul. 2006, pp. 1767-1774.

Oh, H.-S. et al. "Bidirectional Equalizer Arbitrated by Viterbi Decoder Path Metrics." IEEE Transactions on Consumer Electronics, vol. 53, Iss. 1, Feb. 2007, pp. 60-64.

Hochwald, B. M. et al. "Achieving Near-Capacity on a Multiple-Antenna Channel." IEEE Transactions on Communications, vol. 51, No. 3, Mar. 2003, pp. 389-399.

Eyuboglu, M. V. et al. "Reduced-State Sequence Estimation with Set Partitioning and Decision Feedback." IEEE Transactions on Communications, vol. 36, No. 1, Jan. 1988, pp. 13-20.

Bengough, P. A. et al. "Sorting-Based VLSI Architectures for the M-algorithm and T-algorithm and T-algorithm Trellis Decoders." IEEE Transactions on Communications, vol. 43, No. 2/3/4, Feb./Mar./Apr. 1995, pp. 514-522.

Bottomley, "Block Equalization and Generalized MLSE Arbitration for the HSPA WCDMA Uplink," Vehicular Technology Conference, Sep. 21, 2008, pp. 1-5, IEEE, Piscataway, NJ, US.

Hafeez et al., "Adaptive Joint Detection of Cochannel Signals for TDMA Handsets," IEEE Transactions on Communications, Oct. 2004, pp. 1722-1732, vol. 52, No. 10, IEEE, Piscataway, NJ, US.

Smee et al., "Adaptive Space-Time Feedforward/Feedback Detection for High Data Rate CDMA in Frequency-Selective Fading," IEEE Transactions on Communications, Feb. 2001, pp. 317-328, vol. 49, No. 2, IEEE, Piscataway, NJ, US.

Smee et al., "Design Issues in Decision Feedback MMSE Multiuser Receivers for High Data Rate Indoor Wireless CDMA Networks," IEEE 6th International Conference on Universal Personal Communications Record, Oct. 12, 1997, pp. 5-9, IEEE, New York, NY, US.

Gu et al., "Adaptive Decision Feedback Equalization with MLSE Based on Predicted Signals," IEEE International Conference on Communications, Geneva, Switzerland, May 23-26, 1993, pp. 438-442, vol. 1, IEEE, New York, NY, US.

Lee et al., "A Maximum-Likelihood Sequence Estimator with Decision-Feedback Equalization," IEEE Transactions on Communications, Sep. 1977, pp. 971-979, vol. 25, No. 9, IEEE, Piscataway, NJ, US.

Aghdam, Freshteh N., Final Office Action dated May 6, 2011 for U.S. Appl. 12/035,846, filed Feb. 22, 2008.

\* cited by examiner

METHOD AND APPARATUS FOR SYMBOL DETECTION VIA REDUCED COMPLEXITY SEQUENCE ESTIMATION PROCESSING

TECHNICAL FIELD

The present invention generally relates to symbol detection, and particularly relates to using an initial demodulation process to reduce the complexity of symbol detection based on sequence estimation processing.

BACKGROUND

In Wideband Code Division Multiple Access (WCDMA) and other Direct Sequence-CDMA (DS-CDMA) systems, the current trend is towards higher rates via some combination of lower spreading factor, multi-code, higher-order modulation, and spatial multiplexing (MIMO). When the channel is dispersive, which is often the case at typical system bandwidths, some form of channel equalization is needed to provide adequate performance. Linear equalization techniques include "Generalized" Rake (G-Rake) and chip equalization. For an example of G-Rake processing, see Gregory E. Bottomley, et al., "A Generalized RAKE Receiver for Interference Suppression," IEEE Journal on Selected Areas in Communications, Vol. 18, No. 8, August 2000. Linear equalization (in the frequency domain) has been proposed for the uplink of Long Term Evolution (LTE), a 3GPP standard that employs single-carrier, non-spread modulation.

Interest is also burgeoning in non-linear equalization techniques, including decision feedback equalization (DFE). Recently, there has been an effort to enhance DFE so that it performs better. One promising approach is bi-directional DFE (BD-DFE), in which the DFE is run either in the forward direction starting with the first symbol in a sequence of received symbols, or in the backward direction starting with the last symbol in the sequence.

More recently, BD-DFE has been performed by running both forward and backward directions and then further processing the results in some way. One way is arbitration, in which hard decision values from the two directions are selected based on a metric. See, for example, J. K. Nelson, et al., "BAD: Bidirectional arbitrated decision-feedback equalization," IEEE Trans. Comm., vol. 53, no. 2, pp. 214-218, February 2005.

If the decisions made in the two directions of BD-DFE agree for a particular symbol, there is no need to compute and compare metrics. Where they disagree, a window of received values are considered, and a Euclidean distance metric is formed by comparing the received values to predicted values based on the symbol decisions and channel estimates. The direction which gives the best metric determines which direction to select for the symbol in the middle. Such "arbitration" processing has been extended to consider consecutive disagreeing symbol values, determining one metric for the group of symbols. See, for example, X.-G. Tang and Z. Ding, "Contradictory block arbitration for bi-directional decision feedback equalizers," in Proc. IEEE Globecom, Nov. 17-21, 2002, pp. 283-286. Another interesting extension of BD-DFE uses the metric of a forward-error-correction (FEC) decoder to determine which symbol value to select. See, for example, H. S. Oh and D. S. Han, "Bidirectional equalizer arbitrated by Viterbi decoder path metrics," IEEE Trans. Consumer Electronics, vol. 53, no. 1, pp. 60-64, February 2007.

While arbitration can provide significant performance gains over BD-DFE alone, these performance gains come at the expense of potentially significant increases in complexity. In general, DFE-based processing is more complex than linear equalization, such as in G-Rake and chip equalization. In particular, with arbitration-based DFE, the receiver must run DFE-based processing twice: once in the forward direction and once in the reverse direction. Further, the receiver needs to form potentially complex metrics for arbitration when the forward and backward direction results disagree.

Sequence estimation, e.g., Maximum Likelihood Sequence Estimation (MLSE), is another form of non-linear equalization, and it offers significant performance potential for reliably detecting sequences of symbols in a received signal. An MLSE process used for symbol detection processes a given sequence of symbols jointly. More particularly, an MLSE receiver processes received signal samples representative of a total sequence of symbols to be estimated, and produces a maximum likelihood (ML) estimate of the sequence. For one example of MLSE processing, see Gordon L. Stüber, Principles of Mobile Communication 364 (2nd ed. 2001). Further, see U.S. application Ser. No. 10/412,504, as filed by Wang et al. on 11 Apr. 2003, for examples of joint symbol detection, including MLSE-based detection. (Note that the Wang '504 application is co-owned with the instant application.)

Although inter-symbol interference (ISI) cancellation can be optimal with MLSE processing, computation complexity stands as a practical disadvantage of such processing. MLSE processing is particularly burdensome when used with extended sequence lengths and/or when used for estimating sequences of symbol vectors or blocks rather than sequences of individual symbols. (The number of possible symbol values per block is the number of combinations of possible symbol values for the individual symbols in the block.) Generally, the burden for MLSE processing increases significantly with the increasing number of possible paths (symbol vectors) represented by the sequence.

Several known techniques exist for increasing MLSE processing efficiency, such as by limiting sequence lengths—which can compromise estimation performance—and by "pruning" or otherwise eliminating certain paths during sequence estimation. In particular, the so-called "T Algorithm" and "M Algorithm" provide bases for path elimination during MLSE processing. For example, see U.S. Pat. No. 6,347,125 to Dent, which is co-owned with the instant application, for a brief discussion of the "M Algorithm" as used for complexity reduction in sequence estimation. Briefly, the M algorithm reduces the number of retained states by discarding those states with low likelihood metrics, meaning that the best M states are retained.

SUMMARY

Teachings presented herein offer the performance advantages of sequence estimation processing for received signal symbol detection, while simultaneously providing potentially significant reductions in computational overhead. Initial demodulation of a received signal identifies a reduced number of possible symbol values for all or a subset of a sequence of symbols represented in a received signal. A sequence estimation process constrains its state spaces to the reduced number of possible symbol values, rather than considering all possible symbol values.

Thus, a demodulator as taught herein is configured to implement a method of detecting a sequence of symbols in a received signal. In at least one embodiment, the method includes determining a reduced number of possible symbol values for the sequence of symbols by initially demodulating the received signal and detecting candidate symbol values for all or a subset of the sequence of symbols. The method further includes detecting the sequence of received symbols by processing the received signal in a sequence estimation process, e.g., a maximum likelihood sequence estimation (MLSE) process, that is constrained to the reduced number of possible symbol values.

In at least one embodiment of the method, the sequence estimation process is constrained to the reduced number of possible symbol values by limiting state spaces of the sequence estimation process to the candidate symbol values. Detecting the sequence of received symbols may thus comprise constraining state spaces used in the sequence estimation process according to the reduced number of possible symbol values, and determining final symbol values for the sequence of symbols based on processing the received signal via the sequence estimation process.

Sequence estimation complexity is thus reduced by constraining the number of possible symbol values considered during sequence estimation via an initial demodulation process that detects candidate symbol values for the received sequence of symbols. In at least one embodiment, two or more candidate symbol values (or combinations of values for symbol blocks) are detected for each symbol (or symbol block) in the received sequence. For each such symbol or symbol block, the number of candidate symbol values detected preferably is less than the full number of symbol values possible for the symbol or symbol block, meaning that sequence estimation need not consider the full space of possibilities.

Further, in at least one embodiment, the number of candidate symbol values (or combinations of values) detected can vary from symbol-to-symbol (or block-to-block) in the sequence of symbols being detected. For example, only one candidate symbol value or one combination of candidate symbol values may be used to represent a symbol or symbol block detected with a high detection reliability, whereas two or more candidate symbol values or combinations of values may be used to represent a symbol or symbol block detected with a lower detection reliability. In general, however, it should be understood that initial demodulation produces candidate symbols values for the received sequence of symbols comprising a reduced number of possible symbol values for all or a subset of the symbols in the sequence. That is, the overall number of candidate symbol values detected in the initial demodulation process is reduced as compared to the overall number of possible symbol values represented by the received sequence of symbols.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
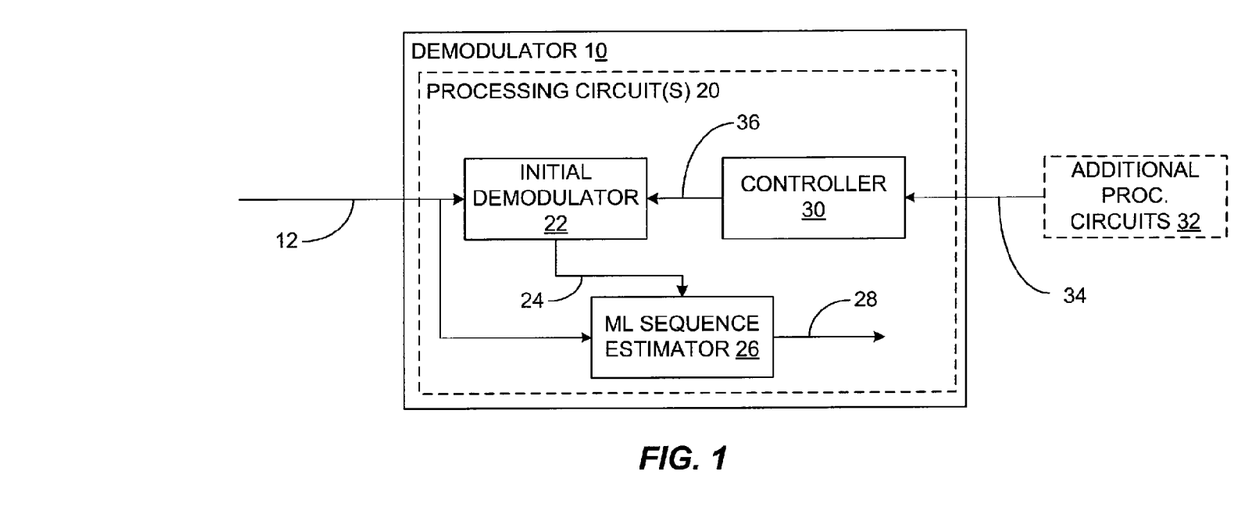
FIG. 1 is a block diagram of one embodiment of a demodulator circuit according to teachings presented herein.
Figure 2:
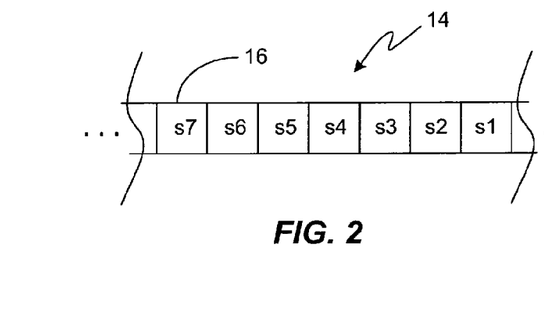
FIGS. 2 and 3 are diagrams illustrating symbol and symbol block sequences, respectively.
Figure 3:
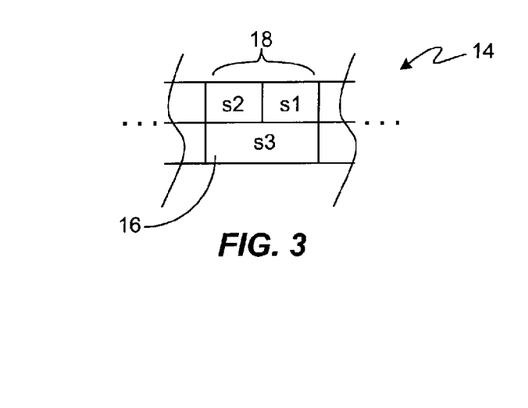

FIG. 1 illustrates a non-limiting example embodiment of a demodulator 10 as contemplated herein. The demodulator 10 processes a received signal 12 that includes a sequence 14 of symbols 16, as shown in FIG. 2, or a sequence 14 of blocks 18 of symbols 16, as shown in FIG. 3. In the discussion herein, the phrase "sequence 14 of symbols 16" should be understood to encompass sequences of individual, successive symbols 16 and sequences of successive blocks 18 of symbols 16, unless contextually noted otherwise. Thus, the received signal 12 comprises, for example, a collection of received signal values representing a sequence 14 of symbols 16, where the signal values may be buffered in memory for demodulation and other processing.

Returning to FIG. 1, the illustrated embodiment of the demodulator 10 comprises one or more processing circuits 20, including an initial demodulator 22 that is configured to determine a reduced number of possible symbol values for the sequence 14 of symbols 16. The demodulator 22 provides this function by initially demodulating the received signal 12 and detecting candidate (e.g., most likely possible) symbol values 24 for all or a subset of the sequence 14 of symbols 16. (Those skilled in the art will appreciate that the "possible" symbol values for a given received symbol are defined by the modulation constellation or symbol alphabet used to form symbols for transmission.) The one or more processing circuits 20 further include a sequence estimator 26—e.g., an MLSE processor—that is configured to detect the sequence 14 of received symbols 16 by processing the received signal 12 in a sequence estimation process that is constrained to the reduced number of possible symbol values 24.

Particularly, in one or more embodiments, the demodulator 22 implements a method whereby it determines a reduced number of possible symbol values for the sequence 14 of symbols 16 by initially demodulating the received signal 12 and detecting candidate symbol values for all or a subset of the sequence 14 of symbols 16. Correspondingly, the sequence estimator 26 detects the sequence 14 of received symbols 16 by constraining state spaces used in the sequence estimation process it implements according to the reduced number of possible symbol values, and determining final symbol values for the sequence 14 of symbols 16 based on processing the received signal 12 via the sequence estimation process.

Such processing identifies the most likely possible symbol sequence 28 for the sequence 14 of symbols 16. Note that the most likely possible symbol sequence 28 may comprise a sequence of the most likely possible symbol values for each in a sequence of individual symbols 16, or may comprise a sequence of the most likely combination of possible symbol values for each block 18 in a sequence 14 of symbol blocks 18.

Regardless of whether individual symbol or block-based processing is adopted, the initial demodulator 22 applies an initial demodulation process to the received signal 12 to identify a reduced number of possible symbol values for the sequence 14 of symbols 16 represented in the received signal 12. Notably, while not implemented in all embodiments of the demodulator 10 contemplated herein, the illustrated embodiment includes a controller 30 that is configured to adapt operation of the demodulator 10 responsive to changing reception conditions. For example, one or more additional processing circuits 32, which may be in or associated with the demodulator 10, provide one or more metrics 34 that are indicative of one or more aspects of signal reception conditions. As a non-limiting example, such circuits 32 include a received signal quality measurement circuit and/or a channel dispersion measurement circuit. The controller 30 evaluates the metric(s) 34, and asserts a control signal 36 that causes the initial demodulator 22 to change the initial demodulation process it applies to the received signal.

Figures 4, 5, 6:
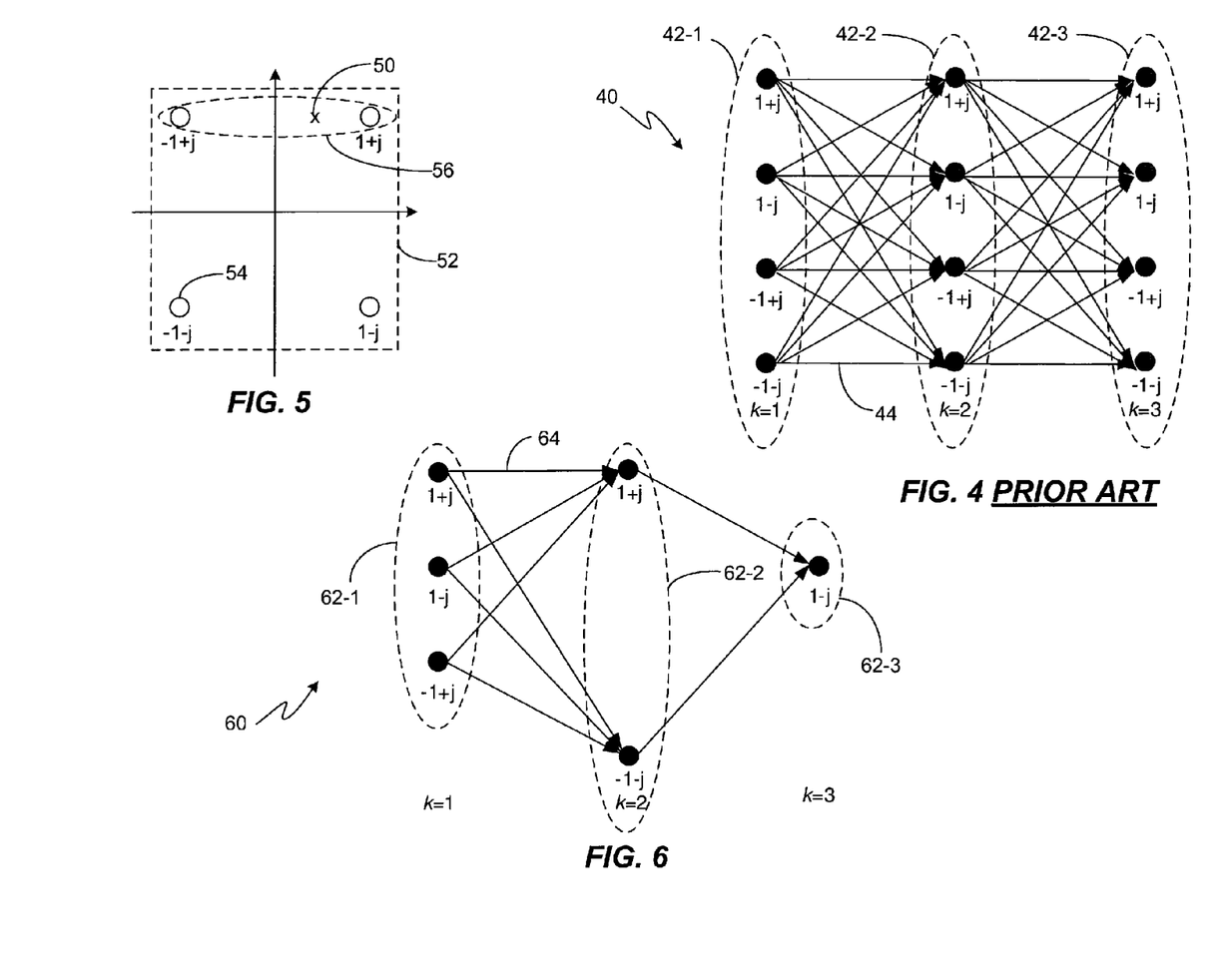
FIG. 4 is a diagram of a conventional MLSE trellis.
FIG. 5 is a diagram of a defined constellation of possible symbol values and one embodiment of a corresponding distance-based metric for identifying a subset of most likely possible values.
FIG. 6 is a diagram of one embodiment of a simplified trellis based on constrained state spaces as limited by initial demodulation results.

Before exploring those operational details, however, it is helpful to consider sequence estimation processing for an example sequence of three QPSK symbols. As is known, each QPSK symbol has a defined alphabet of four possible symbol values: $1+j$, $-1+j$, $-1-j$, and $1-j$. FIG. 4 illustrates a conventional trellis 40 for MLSE processing of three sequential QPSK symbols. Notably, the symbols received at symbol times k=1, k=2, and k=3 are represented in the trellis 40 by a sequence of state spaces 42-1, 42-2, and 42-3. Each state space 42-$x$ is defined by the four symbol values possible for each QPSK symbol. One sees that each possible symbol value for a given one of the symbols connects via branches 44 to all other possible symbol values for the next symbol in the sequence.

The particular set of branches 44 interconnecting a particular combination of possible symbol values through the overall sequence of state spaces 42-1, 42-2, and 42-3 is referred to as a symbol sequence. One sees that a sequence three symbols deep with only four possible symbol values per symbol nonetheless produces sixty-four possible symbol sequences, i.e., 4×4×4=64. The particular set of branches 44 interconnecting the most likely sequence of possible symbol values is identified by MLSE processing, which conventionally considers all sixty-four possible symbol sequences, or at least begins processing with fully implemented state spaces 42 and then uses M or T algorithm processing to prune less likely paths.

Advantageously, however, the demodulator 10 contemplated herein uses the initial demodulator 22 to apply an initial demodulation process to the received signal 12, to identify a reduced number of possible symbol values to consider in MLSE processing. As a general proposition, a "full" set of candidate symbol values for each QPSK symbol includes four members, i.e., all possible values as defined by the QPSK modulation constellation. A reduced set of candidate symbol values thus includes fewer than four values. Reduced complexity sequence estimation as taught herein uses initial demodulation to reduce the number of candidate symbol values to be considered in sequence estimation processing for one or more symbols in a received sequence of symbols. For example, for a given three-symbol sequence of QPSK symbols, initial demodulation as taught herein may identify two candidate symbol values for each such symbol, such as by detecting the two most likely possible symbol values for each one. Of course, such processing is quite flexible, and the number of candidate symbol values detected for each such received symbol may vary, such as by evaluating how reliably each such symbol is detected. More reliable detection results in fewer candidate symbol values, while less reliable detection may result in more candidate symbol values. For a given symbol to be detected, then, one may view the size of the corresponding sequence estimation state space to be larger or smaller in dependence on the detection reliability.

Whether or not detection reliability is considered in candidate symbol value detection, however, those skilled in the art will appreciate that the number of candidate symbol values to be considered by the sequence estimation processing will be reduced through initial demodulation processing, as compared to the overall number of possible symbol values represented by the received sequence. FIG. 5 illustrates an example of such processing, and continues the QPSK context. In FIG. 5, one sees an actual received symbol 16 represented as a soft value 50, for comparison to the full set 52 of possible symbol values 54.

As will be explained, evaluating soft values may comprise some form of Euclidean distance evaluation. From the diagram, one sees that it is more likely in a distance sense that the soft value 50 is closer to the rightmost, upper one of the possible symbol values 54. However, rather than producing a decision value representing the closest possible symbol value 54, the initial demodulator 22 may output two or more candidate symbol values. For example, the initial demodulator 22 may output two candidate symbol values as the candidate symbol values 56 for the soft value 50. The set of candidate symbol values 56 is reduced in the sense that it includes fewer than all possible symbol values defined by the full set 52.

Collectively, such processing on a symbol or symbol block basis for a given sequence 14 of symbols 16 or symbol blocks 18 produces the reduced set of candidate symbol values 24 illustrated in FIG. 1. However, those skilled in the art should appreciate that one or more embodiments of the initial demodulator 22 do not necessarily produce the same number of candidate symbol values for each symbol 16 or symbol block 18 in a given sequence 14. FIG. 6 illustrates that point, and, more generally illustrates the potentially dramatic reduction in MLSE processing complexity gained by operation of the initial demodulator 22.

In FIG. 6, reduced-complexity MLSE processing is represented by a simplified trellis 60, formed from constrained state spaces 62-1, 62-2, and 62-3. The sequence of constrained state spaces 62-1, 62-2, and 62-3 corresponds to a sequence of three QPSK symbols, in keeping with the earlier example. For the k=1 symbol time, the initial demodulator 22 identified three candidate symbol values, thereby constraining state space 62-1 to three states rather than four. For the k=2 symbol time, the initial demodulator 22 identified two candidate symbol values, thereby constraining state space 62-2 to two states rather than four. Finally, for the k=3 symbol time, the initial demodulator 22 identified one candidate symbol value, thereby constraining the state space 62-3 to one state rather than four.

The varying number of candidate symbol values identified for any given symbol 16 or symbol block 18 is, in one or more embodiments, driven by the reliability of detection for that symbol 16 or symbol block 18. Referring momentarily back to FIG. 5, one sees that a soft value 50 representing a given received symbol 16 could be equidistant from all four possible symbol values 54, meaning that the initial demodulator 22 would output all four possible symbol values 54 for that soft value. More commonly, however, a given soft value 50 will be closer to one or a subset of the possible symbol values 54, meaning that fewer than all possible symbol values are "most likely" for that soft value 50. Further, distance thresholds and/or other detection reliability thresholds can be used to limit or expand the number of candidate symbol values identified by the initial demodulator 22.

With this aspect of operation in one or more embodiments of the initial demodulator 24, those skilled in the art will appreciate that the most likely possible symbol values 24 shown in FIG. 5 represent fewer than the overall number of possible symbol values that otherwise would be considered for a given sequence 14 of symbols 16. However, in at least one embodiment of the initial demodulator 22, the actual number of candidate symbol values identified for any given symbol 16 or symbol block 18 in a sequence 14 can be one, two, or any number up to the full number of possible symbol values defined by the symbol alphabet.

Turning back to FIG. 6, the sequence estimation processor 26 performs sequence estimation using the reduced state spaces 62-1, 62-2, and 62-3. One sees that constraining the state spaces 62-1, 62-2, and 62-3 greatly reduces the number of interconnecting branches 64 and thereby greatly reduces the number of possible symbol sequences to consider for MLSE processing. In particular, the full-state space implementation shown in FIG. 5 involves sixty-four possible symbol sequences, whereas the constrained state space implementation illustrated in FIG. 6 involves only six possible symbol sequences. Even more dramatic reductions occur with longer sequences, larger symbol alphabets, and block-based estimation involving many different combinations of possible symbol values.

Figure 7:
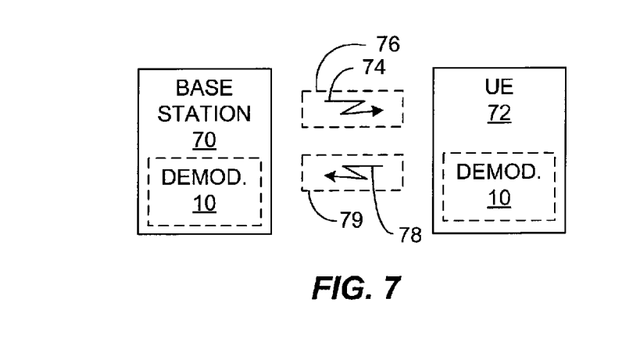
FIG. 7 is a block diagram of a wireless communication network base station and corresponding user equipment, either or both of which may be configured with demodulation circuits for symbol sequence estimation according to the teachings herein.

The significant reductions in sequence estimation processing complexity gained by constraining sequence estimation state spaces according to the results of initial demodulation can be particularly beneficial for received signal processing in wireless communication contexts, although the invention is not limited to such applications. FIG. 7 thus illustrates a base station 70 for use in a wireless communication network, for supporting wireless communications with a user equipment (UE) 72. The base station 70 comprises, for example, a WCDMA or other type of base station, and the UE 72 comprises a cellular radiotelephone, pager, network access card, computer, PDA, or other type of wireless communication device.

In one embodiment, the UE 72 includes an embodiment of the demodulator 10 as taught herein, for processing downlink signals 74 transmitted by the base station 70 over a time-dispersive channel 76. Additionally or alternatively, the base station 70 includes an embodiment of the demodulator 10 as taught herein, for processing uplink signals 78 transmitted by the UE over a time-dispersive channel 79, which may or may not be the same as the channel 76.

In a particular embodiment contemplated herein, the base station 70 comprises an LTE base station (i.e., it is configured for operation in a wireless communication network configured according to the Long Term Evolution standards promulgated by the 3GPP). The complementary pairing of initial demodulation and corresponding constrained MLSE processing as taught herein thus is applied to the LTE uplink. The format of this uplink can be viewed as a special form of single-carrier transmission involving the use of a cyclic prefix. Demodulation as taught herein simplifies frequency-domain linear equalization in LTE uplink signal processing. That is, frequency-domain linear equalization can be used as the initial demodulation stage—i.e., as the initial demodulator 10. The linear equalizer output can be used to obtain the N best symbol values for each symbol of interest. Then, a constrained MLSE in the time domain can be used to determine the final symbol values. Thus, in the LTE context and in other contexts, the teachings herein can be used as an "add-on" to conventional demodulation, to improve performance. Because the constrained sequence estimation processing taught herein generally considers only a small subset of the overall number of possible symbol values, its complexity is greatly reduced and adding such processing therefore is quite practical.

Figure 8:
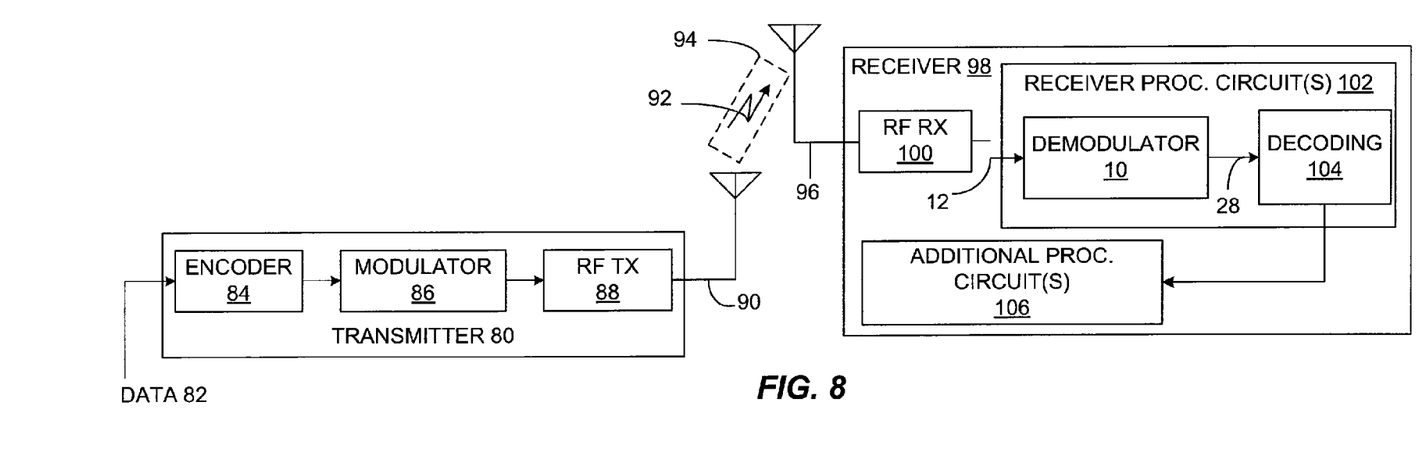
FIG. 8 is a block diagram of one embodiment of a transmitter and receiver, where the receiver is configured with demodulation circuits for symbol sequence estimation according to the teachings herein.

FIG. 8 provides a more detailed but non-limiting transmitter/receiver example, which provides a basis for more detailed discussion of one or more embodiments of the demodulator 10. At a transmitter 80, information symbols 82 are optionally encoded using a forward-error-correction (FEC) encoder 84, such as a convolutional encoder or turbo-code encoder. The resulting modem bits are provided to a modulator 86, where modem symbols are formed (e.g. QPSK, 16-QAM) and used to modulate spreading waveforms. These spreading waveforms are then modulated onto a radio carrier in RF transmit circuits 88, and transmitted on one or more transmit antennas 90. The transmitted signal 92 passes through a transmission medium 94, such as a multipath fading channel, and arrives at one or more receive antennas 96 at a receiver 98. The received signals are processed by a front-end RF circuit 100, which mixes them down to baseband and digitizes them to form a baseband signal that, in this embodiment, represents the earlier identified received signal 12. The received signal values comprising the received signal 12 thus represent or otherwise convey a given sequence of symbols.

Receiver processing circuits 102 include an embodiment of the demodulator 10, which may be configured to process the received signal 12 on a per-symbol or per-symbol block basis. In particular, as taught herein, the demodulator 10 applies an initial demodulation process to the received signal 12 to identify candidate symbol values for the received signal 12, and then applies a MLSE process to the received signal 12 to detect the actual sequence of received symbols in the received signal 12, wherein the state spaces used by MLSE processing are reduced to considering the candidate symbol values as identified in the initial demodulation process.

The detected sequence 28 of symbols 16 is output by the sequence estimation processor 26 of the decoder 10 for input to a decoding circuit 104, which decodes the detected symbols to recover the originally transmitted information. The decoding circuit 104 outputs such information to one or more additional processing circuits 106, for further operations. The nature of the additional processing circuits varies with the intended function or purpose of the receiver 98, e.g., base station circuit, mobile terminal circuit, etc., and it should be understood more generally that the illustrated architecture of the receiver 98 is non-limiting.

Figure 9:
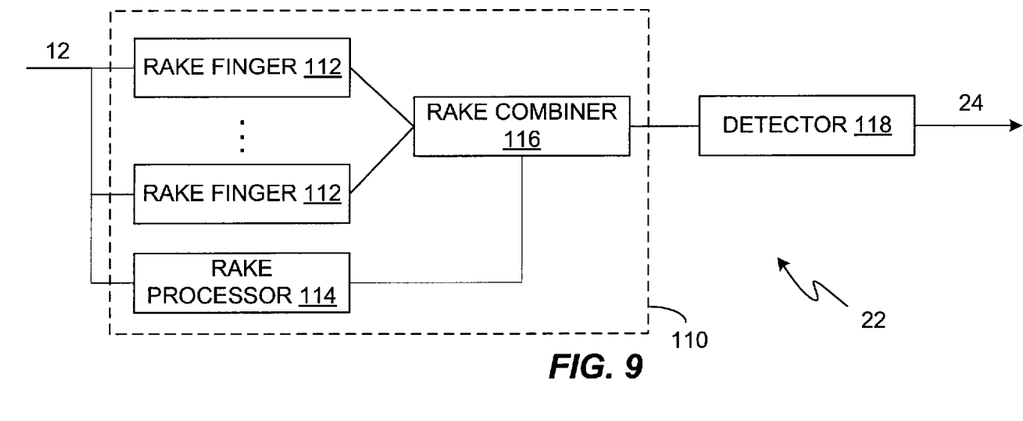
FIGS. 9 and 10 are embodiments of Rake based and G-Rake based implementations, respectively, of an initial demodulator as taught herein.

Likewise, significant flexibility exists regarding the detailed implementation of the demodulator 10. For example, in FIG. 9 the initial demodulator 22 comprises a Rake receiver circuit 110 that includes a plurality of Rake fingers 112 used to despread the received signal 12 at various processing delay offsets corresponding to identified multipath components of the received signal 12. A Rake processor 114 sets the delay offsets based on path searching, and computes despread value combining weights based on channel estimates, and a combining circuit 116 combines the Rake-finger outputs to produce a Rake-combined signal that, over a given time window, represents Rake-combined soft values corresponding to a sequence 14 of symbols 16 as represented by the signal values comprising the received signal 12. A detector 118 is configured to evaluate these soft values to produce the most likely possible symbol values 24 for the sequence 14. Note that a Rake receiver can also be implemented in a chip equalization structure, in which matching to the channel is performed prior to despreading.

Figure 10:
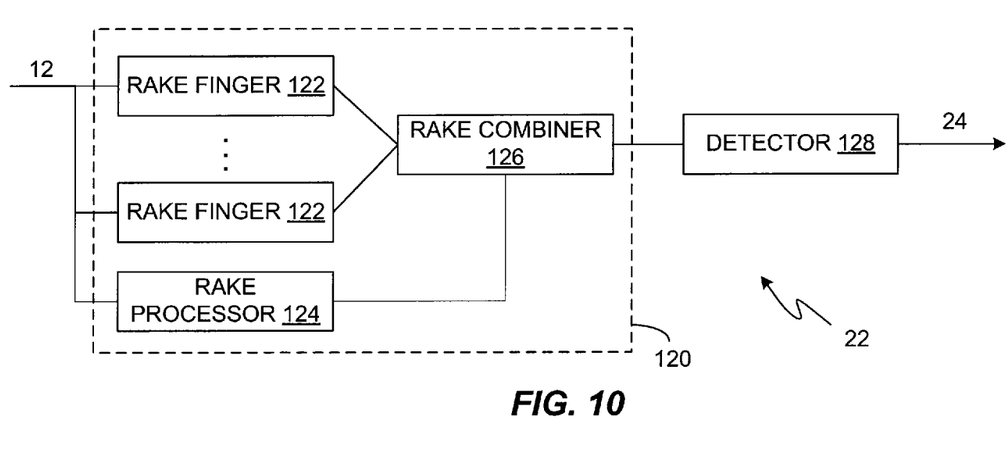

FIG. 10 illustrates a similar embodiment, but where the initial demodulator 22 comprises a G-Rake receiver circuit 120. As with the Rake embodiment, the G-Rake embodiment includes a number of Rake fingers 122 for despreading the received signal 12 at various processing delay offsets, but various ones of the Rake fingers 122 may be arranged for collecting desired signal energy and for collecting interfering signal energy and, complementing that collection, the Rake processor 124 is configured to compute Rake combining weights in consideration of impairment correlations observed across the Rake fingers 122. In that manner, combining the finger outputs in a combining circuit 126 suppresses colored interference present in the received signal 12. The G-Rake combined values output by the combining circuit 126 are input to a detector 128, which identifies the most likely possible symbol values 24 from them. Note that the G-Rake receiver can be implemented in a chip equalizer structure as well.

Figure 11:
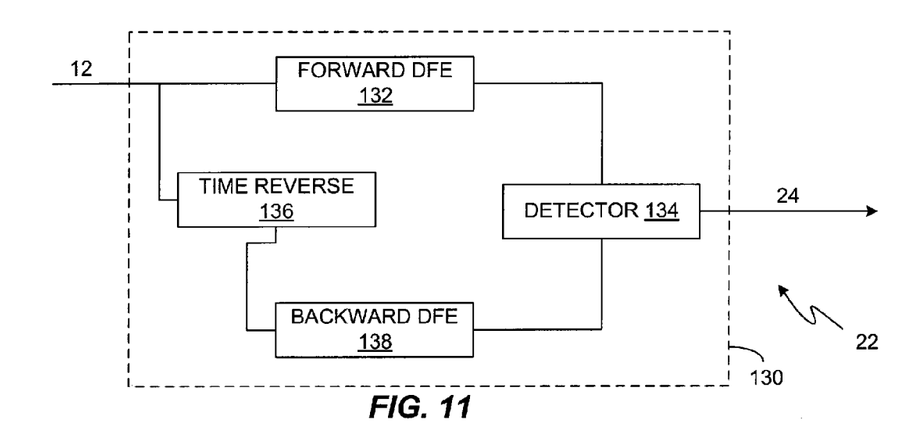
FIG. 11 is an embodiment of a decision feedback equalization (DFE) based implementation of an initial demodulator.

FIG. 11 illustrates yet another embodiment, where the initial demodulator 22 is implanted as a bidirectional decision feedback equalization (DFE) circuit 130. Here, soft values for a sequence 14 of symbols 16 are generated in a forward DFE processor 132, and a detector 134 forms a first set of symbol decisions for the sequence 14 based on the forward processing results. Further, a time-reverse circuit 136 reverses the order of the signal values comprising the received signal 12 over the time window of interest, and provides the time-reversed version of the received signal 12 to a backward DFE processor 138, which generates soft values for the time-reversed sequence 14. The detector 134 forms a second set of symbol decisions from this set of soft values. Unlike "arbitration" as used to pick between forward and backward processing results in conventional forward/backward DFE processors, the DFE circuit 130 of FIG. 11 can be configured to output one symbol decision—i.e., one lone possible symbol value—for symbols 16 in the sequence 14 where the corresponding forward and backward symbol decisions agree, and to output two symbol decisions where those results disagree. (Similar logic can be applied to the diction of symbol blocks 18, and to the resolution of forward and backward block detection results.)

Though not shown, the initial demodulator 22 can be implemented as a single-directional DFE. The DFE circuit outputs two or more symbol values corresponding to the best and second-best symbol values. With multicode transmission in a CDMA system, a block DFE circuit (BDFE) can be used. Of particular interest are the BDFE and block linear equalization (BLE) with joint detection circuits described in the U.S. patent application by Bottomley and Wang, filed concurrently herewith and entitled "A Method and Apparatus for Block-Based Signal Demodulation." That application, which is commonly assigned with the instant application, is incorporated herein by reference, and is identified by Ser. No. 12/035,846. Such circuits can be used to determine best and second-best symbol vectors for each block.

Figure 12:
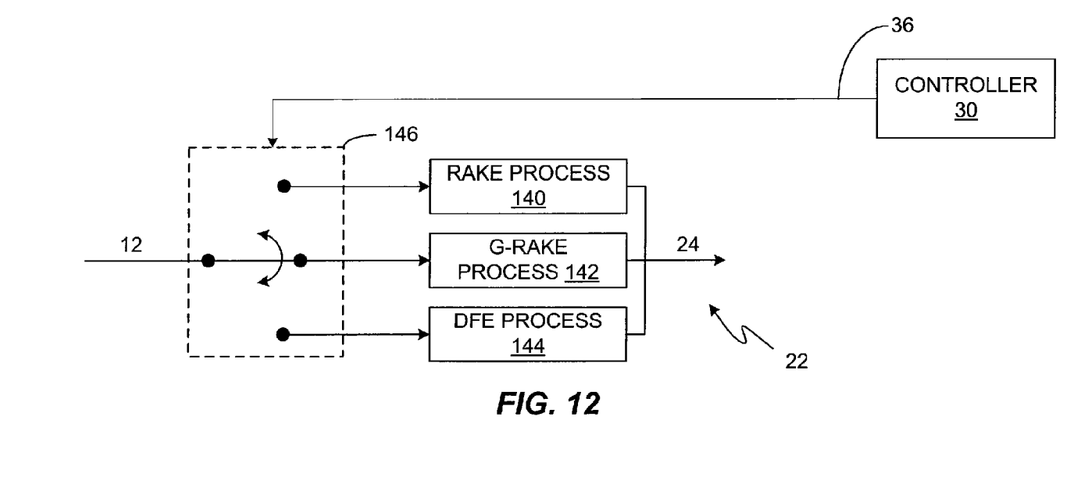
FIG. 12 is an embodiment of an initial demodulator offering selectable types of demodulation processing.

Given that all or at least significant parts of Rake, G-Rake, and DFE processing can be implemented flexibly, the initial demodulator 22 may be configured to selectively provide any one or more of these initial demodulation processes. For example, as shown in FIG. 12, the initial demodulator 22 may be implemented using hardware resources, software resources, or any combination thereof, in a manner that allows the initial demodulator 22 to apply a Rake process 140 to the received signal 12, apply a G-Rake process 142 to the received signal 12, or apply a (forward/backward) DFE process 144 to the received signal. Which process is applied may be controlled by a selection signal 36 as produced by the controller 30 first illustrated in FIG. 1. As noted, the controller 30 may receive signaled or measured information identifying the time dispersiveness of the propagation channel through which the received signal 12 is received, and/or information identifying the signal quality of the received signal 12—which may be expressed, for example as a signal-to-noise ratio (SNR).

Thus, the demodulator 10 can be configured to implement a method of adapting the initial demodulation of the received signal 12 responsive to changing reception conditions by choosing one of two or more available types of received signal demodulation processes, e.g., Rake 140, G-Rake 142, or DFE 144, responsive to evaluating at least one of channel dispersion and received signal quality. Choosing one of two or more available types of received signal demodulation processes may comprise choosing between a Rake-based demodulation process (e.g., Rake and/or G-Rake) and a decision feedback equalization-based demodulation process, based on evaluating at least one of channel dispersion and received signal quality. The selection may be accomplished by asserting a selection signal 36, which is operative (at least logically, if not literally) to control a logical selection circuit 146 that itself is operative to select a given one of the available demodulation processes. Of course, the logical selection circuit 146 is illustrated as a switch for ease of understanding. In actuality, it may comprise a multiplexing circuit or other selection arrangement, or may comprise programmed decision logic within firmware-based or software-based computer program instructions that implement demodulation processing as taught herein.

According to the above teachings, then, the initial demodulation process applied to the received signal 12 can be selected adaptively, based on channel dispersion and/or SNR. For example, for small dispersion and/or low SNR, Rake processing by the initial demodulator 22 may be sufficient. For high dispersion and moderate SNR, G-Rake processing may be used. Finally, for high dispersion and high SNR, DFE processing may be used. Additionally, or alternatively, the modulation order and/or data rate of the received signal 12 may also be used by the control circuit 30 to adaptively select the type of demodulation processing performed by the initial demodulator 22.

Broadly, whether adaptive demodulation processing is used or not, it should be understood that the teachings herein present an initial demodulator 22, however implemented, that can generate more than one possible value for all or a subset of the symbols 16 in a sequence 14 of symbols 16 or symbol blocks 18 to be detected. The multiple symbol values produced in initial demodulation are in number reduced with overall respect to the full universe of possible symbol values. That is, rather than conventionally detecting a single, most likely value for each received symbol, the initial demodulator 22 generally outputs two or more candidate symbol values for each symbol 16 being detected, or outputs two or more most likely combinations of possible symbol values for each symbol block 18 being detected.

As explained, some soft values may map so closely to a given possible symbol value that the initial demodulator 22 identifies only one most likely symbol value for that soft value. In another exceptional circumstance, a given soft value may not be closer to any given possible symbol value, resulting in all possible symbol values being detected for that soft value. However, in general, when an overall sequence 14 of symbols 16 or symbol blocks 18 is considered, the initial demodulator 22 is operative to define a number of candidate symbols values 24 that is less than the overall universe of possible symbol values defined for that sequence 14. More particularly, the number of candidate symbol values 24 defined for a given sequence 14 represents a reduced number of possible symbol sequences as compared to the universe of possible symbol sequences represented by the given sequence 14.

Thus, initial demodulator 22 can be any demodulator that produces more than one symbol value for at least one symbol 16, or more than one combination of possible values for a symbol block 18 for a least one symbol block, in a given sequence 14 of symbols 16. One way of achieving this is to take a detector that finds the best symbol value, using some metric, and modify it to produce the second best, third best, etc. values. For example, if the detector produces a soft symbol estimate, this estimate can be compared to all possible symbol values, producing a Euclidean distance metric. The symbols with the N best Euclidean distance give the N best values, such as was shown in FIG. 5.

For use in narrowband systems, such as GSM/EDGE, the initial demodulator 22 can be a conventional single-symbol detector or a linear equalizer, such as a Minimum Mean Square Error (MMSE) equalizer. The general point is that the initial demodulator 22 produces not just the best detected value, but additionally at least a second best value, for all or a subset of the symbols 16 or symbol blocks 18 being detected in a given sequence 14. Note that in CDMA systems, multiple signals overlap in time using different channelization codes or spreading codes. These codes can correspond to multiple users or one user using multiple codes (multi-code transmission). In such cases a block-based DFE can be used to equalize multiple codes in parallel and it should be understood that in at least one embodiment, the DFE circuit 130 of FIG. 11 is configured to perform block-based decision feedback equalization processing, and is configured to perform block-based joint symbol detection, such that one or more most likely combinations of possible symbol values are output for a given symbol block 18. Correspondingly, the sequence estimation processor 26 can be configured to estimate sequences of symbol blocks, wherein its state spaces represent constrained sets of the most likely combinations of possible symbol values for the symbol blocks 18 being detected.

For example, if there are 3 N-ary symbols in a symbol block 18, within a sequence 14 of symbol blocks 18, then this would give up to N cubed possible block values. The actual number of block values to be considered in MLSE processing can be reduced by computing a block metric, such as a joint detection metric or computing symbol or even bit metrics and adding them up. Note that the number kept can change with each symbol period, so that the number of states varies over time. In any case, block detection processing as set forth herein advantageously reduces the number of block values considered by the sequence estimation processor 26.

To better appreciate that advantageous MLSE processing, it may be helpful to examine conventional MLSE for multi-code CDMA, which can be performed at the chip level, processing chip samples from one or more receive antennas, or at the symbol-level, using Rake combined values or G-Rake combined values. Note that G-Rake processing in advance of MLSE detection can be adapted not to suppress self-interference in the received signal. The Rake or G-Rake combined values can be viewed as initial symbol estimates.

At the symbol level, let vector $z(k)$ denote the initial symbol estimates for symbols from different parallel codes at symbol period k. The following branch metric can be computed from these initial symbol estimates, $$B(a(k), a(k-1), \ldots) = \mathrm{Re}\left\{a^H(k)\left[2z(k) - S(0,k)a(k) - \sum_{l>0} S(l,k)a(k-l)\right]\right\}, \quad \text{Eq. (1)}$$

where $a(k)$ is a hypothesized symbol vector, $S(l,k)$ is the Ungerboeck "s-parameter" matrix that gives the response of symbol vector $s(k-l)$ on $z(k)$. It may also include an impairment correlation matrix when the noise is not white. With conventional MLSE, $a(k)$ takes on all possible values, which depend on the modulation used. For example, as noted in an earlier example, for QPSK modulation and a sequence of 3 symbol values, there would be 4×4×4=64 possible symbol sequences to consider.

Consider the simple case where a state corresponds to different symbol values of the current symbol period. Then, the branch metric would be given by $$B(a(k), a(k-1), \ldots) = \mathrm{Re}\{a^H(k)[2z(k) - S(0,k)a(k) - S(1,k)a(k-1)]\}. \quad \text{Eq. (2)}$$

For QPSK with unconstrained MLSE processing, there would be four states. For each state at time k, new path metrics would be computed using $$P(a(k)) = \max_{a(k-1)} \{C(a(k), a(k-1))\}, \quad \text{Eq. (3)}$$

and $$C(a(k),a(k-1)) = P(a(k-1)) + B(a(k),a(k-1)), \quad \text{Eq. (4)}$$

where the C's are the candidate path metrics. Where a symbol block consists of only 1 QPSK symbol, there are four possible symbol values: $1+j$, $1-j$, $-1+j$, and $-1-j$. At time k, there is a state for each possible value of $s(k)$. The path metric is determined from four candidate metrics, corresponding to the four possible values for $s(k-1)$.

Once all the data within a time period (e.g. time slot) is processed, the best state is determined. Then, a trace-back operation is performed to determine the detected symbols. To reduce memory, trace-back is sometimes performed on a sliding window basis.

However, according to the teachings presented herein, not all possible symbol sequences are considered. Instead, only those sequences determined by the initial demodulation stage are used. This was seen in the reduced trellis of FIG. 6, for example. There, at time k=1, only 3 of the 4 possible QPSK values were considered. At time k=2, only 2 values were considered; and at time k=3, only 1 value was considered. In general, the number of values considered at any given symbol time within the sequence 14 being estimated can vary with k.

Figure 13:
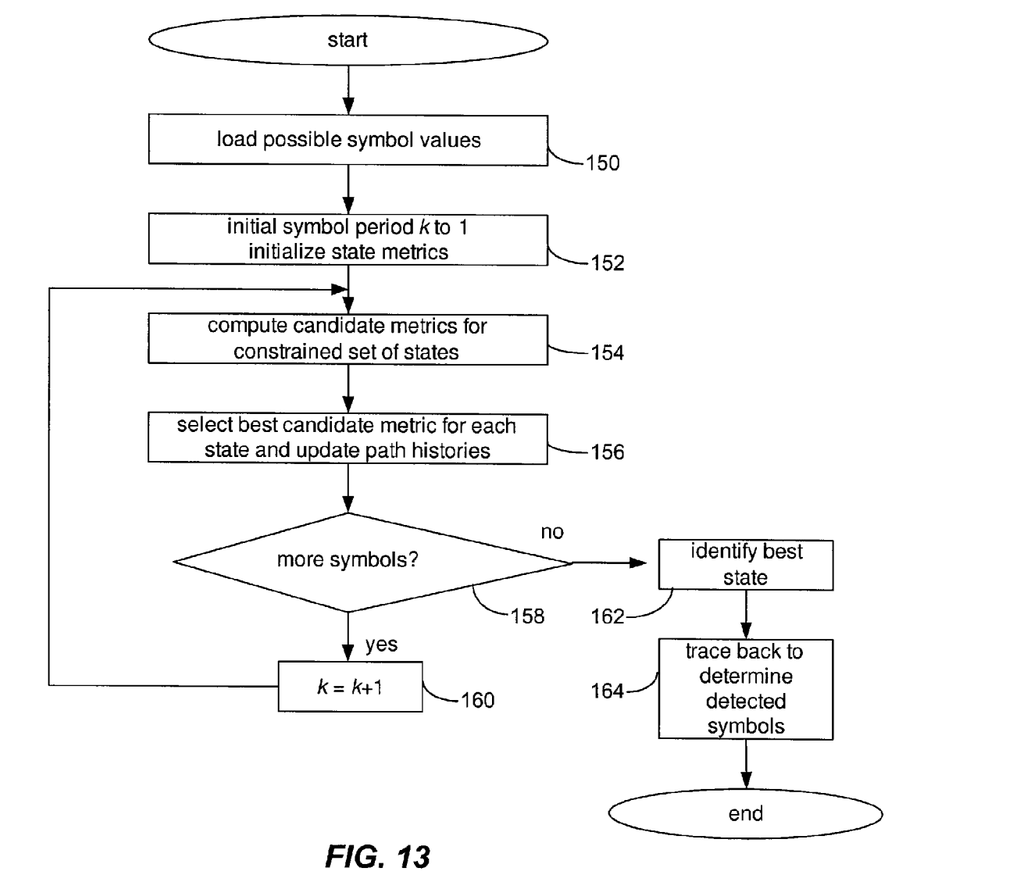
FIG. 13 is a logic flow diagram of one embodiment for MLSE based processing using constrained state spaces.

A flow diagram of one embodiment of constrained MLSE processing as contemplated herein is shown in FIG. 13. Here, a constrained MLSE process is used to select among the initial demodulation results, i.e., to select the most likely one of the reduced number of possible symbol values corresponding to the candidate symbol values 24 identified by the initial demodulator 22.

Particularly, processing begins with loading the possible symbol values to consider in constrained MLSE processing (Block 150), which were identified by initial demodulation of the received signal 12. Processing continues with initializing the symbol time to k=1 for the first symbol time in the sequence 14 being estimated (Block 152). The state metrics are also initialized.

The branch metric used by a MLSE-based implementation of the sequence estimation processor 26 can be rewritten into two terms: one that depends only on a(k) and one that depends on past symbols:

$$B(a(k),a(k-1))=E(a(k))+D(a(k),a(k-1)), \quad \text{Eq. (5)}$$

where $$E(a(k)) = \text{Re}\{a^H(k)[2z(k) - S(0, k)a(k)]\}, \quad \text{Eq. (6)}$$

and $$D(a(k), a(k-1)) = -2\text{Re}\{a^H(k)S(1, k)a(k-1)\}. \quad \text{Eq. (7)}$$

When determining the best (max) candidate metric, only the delta metric D is added to the previous path metric. Once the best candidate has been determined, then the remaining branch metric E can be added in.

Accordingly, the sequence estimation processor 26 computes candidate metrics for the constrained state space determined by initial demodulation for the current symbol time (Block 154), and selects the best candidate metric for each state within the constrained state space, and updates the path histories (Block 156). If there are more symbols 16 (or symbol blocks 18) to consider in the sequence 14 (Yes from Block 158), processing repeats through Blocks 154 and 156 for the next symbol time. Otherwise, processing continues with identifying the best state (Block 162), and tracing back to determine the detected symbols or symbol blocks (Block 164). Such processing amounts to identifying the most likely one of the reduced number of possible symbol values or vectors represented by the constrained state spaces used for MLSE processing.

Further, complexity reduction approaches applied to conventional MLSE processing can also be applied to MLSE processing as taught herein. For example, the M and T algorithms can be used. For example, the number of states can be pruned further by only keeping the M best states. Algorithms such as Soft Output Viterbi Algorithm (SOVA) can be used to extract soft information from the MLSE processing, if desired. There are also known ways of dealing with partial trellis situations, such as result from using the M algorithm.

With these and other points of flexibility in mind, those skilled in the art should appreciate that the teachings herein can be used with various transmit and receive configurations, including transmit diversity and MIMO transmission. Broadly, initial demodulation is used to generate at least two candidate symbol sequences, as represented by the candidate symbol values 24 output by the initial demodulator 22, which are then used to constrain the state spaces of a joint detector, e.g., the sequence estimation processor 26, which identifies the most likely one of the two or more candidate symbol sequences as identified by initial demodulation.

Figure 14:
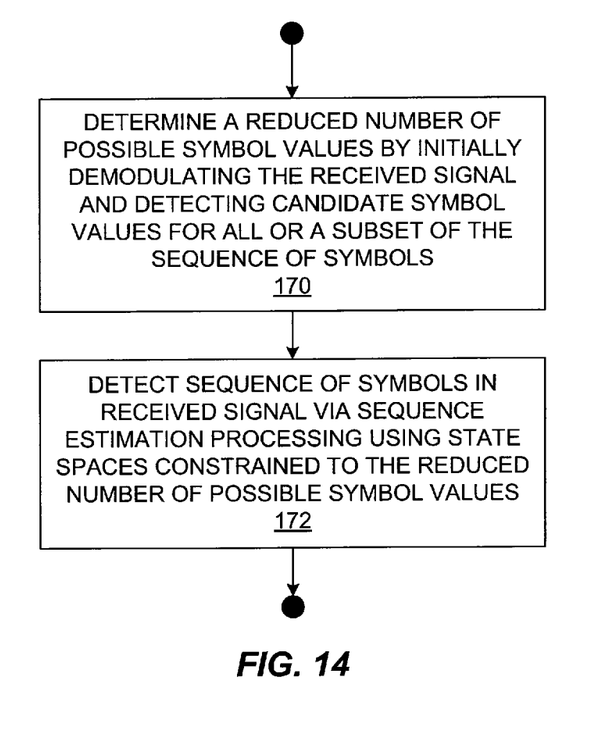
FIG. 14 is a logic flow diagram of one embodiment for initial demodulation processing and corresponding MLSE based processing, using reduced state spaces obtained from the initial demodulation.

FIG. 14 illustrates one method of this advantageous pairing of initial demodulation processing and MLSE processing for symbol detection. In FIG. 14, processing begins with determining a reduced number of possible symbol values for a sequence of symbols by initially demodulating the received signal 12 and detecting candidate symbol values for all or a subset of the sequence of symbols (Block 170). Processing continues with detecting the sequence of received symbols by processing the received signal 12 in a sequence estimation process that is constrained to the reduced number of possible symbol values (Block 172).

Such constraining may be accomplished by limiting state spaces of the sequence estimation process to the candidate symbol values. Further, detecting most likely possible symbol values for all or a subset of the sequence of symbols may comprise identifying two or more candidate symbol values for each symbol or symbol block in all or a subset of the sequence of symbols. As noted, such processing may comprise performing time-wise forward decision feedback equalization and corresponding symbol detection to produce a first symbol decision for each symbol or symbol block in the sequence of symbols, performing time-wise backward decision feedback equalization and corresponding symbol detection to produce a second symbol decision for each symbol or symbol block in the sequence of symbols, and setting the corresponding first and second symbol decisions as the two or more candidate symbol values for each symbol or symbol block. Or, such processing may comprise performing Rake (e.g., Rake or G-Rake) demodulation of the received signal to produce soft values for the sequence of symbols and evaluating the soft values to determine two or more candidate symbol values for each symbol or symbol block in the sequence of symbols.

In any case, determining a reduced number of possible symbol values for the sequence of symbols may comprise identifying a reduced number of possible symbol values or vectors for the sequence of symbols by initially demodulating the received signal and detecting candidate symbol values for all or a subset of the sequence of symbols. This may be thought of as using initial demodulation to produce a reduced set of candidate symbol sequences, such that constrained MLSE processing identifies the most likely one of the reduced number of candidate symbol sequences identified during initial demodulation.

Therefore, those skilled in the art will recognize that the present invention therefore is not limited by the foregoing description and accompanying drawings. Instead, the present invention is limited only by the following claims and their legal equivalents.

The invention claimed is:

1. A method of detecting a sequence of symbols in a received signal comprising:
    determining a reduced number of possible symbol values for the sequence of symbols by initially demodulating the received signal and detecting candidate symbol values for all or a subset of the sequence of symbols;
    detecting the sequence of received symbols by processing the received signal in a sequence estimation process that is constrained to the reduced number of possible symbol values; and
    adapting the initial demodulation of the received signal responsive to changing reception conditions by choosing one of two or more available types of received signal demodulation processes responsive to evaluating at least one of channel dispersion and received signal quality, wherein choosing one of two or more available types of received signal demodulation processes comprises choosing between a Rake-based demodulation process and a decision feedback equalization-based demodulation process based on evaluating at least one of channel dispersion and received signal quality.

2. The method of claim 1, wherein the sequence estimation process is constrained to the reduced number of possible symbol values by limiting state spaces of the sequence estimation process to the candidate symbol values.

3. The method of claim 1, wherein detecting candidate symbol values for all or a subset of the sequence of symbols comprises identifying two or more candidate symbol values for each symbol or symbol block in the sequence of symbols.

4. The method of claim 3, wherein identifying two or more candidate symbol values for each symbol or symbol block in the sequence of symbols comprises:
performing time-wise forward decision feedback equalization and corresponding symbol detection to produce a first symbol decision for each symbol or symbol block in the sequence of symbols;
performing time-wise backward decision feedback equalization and corresponding symbol detection to produce a second symbol decision for each symbol or symbol block in the sequence of symbols; and
setting the corresponding first and second symbol decisions as the two or more candidate symbol values for each symbol or symbol block.

5. The method of claim 3, wherein identifying two or more candidate symbol values for each symbol or symbol block in the sequence of symbols comprises:
performing Rake demodulation of the received signal to produce soft values for the sequence of symbols; and
evaluating the soft values to determine two or more candidate symbol values for each symbol or symbol block in the sequence of symbols.

6. The method of claim 1, wherein determining a reduced number of possible symbol values for the sequence of symbols comprises identifying a reduced number of possible symbol values for the sequence of symbols by initially demodulating the received signal and detecting candidate symbol values for all or a subset of the sequence of symbols.

7. The method of claim 6, wherein detecting the sequence of received symbols comprises constraining state spaces used in the sequence estimation process according to the reduced number of possible symbol values, and determining final symbol values for the sequence of symbols based on processing the received signal via the sequence estimation process.

8. The method of claim 1, further comprising, for each given symbol or symbol block in the sequence of symbols, adapting the number of candidate symbol values detected for the given symbol or symbol block during the initial demodulation as a function of a corresponding symbol detection reliability.

9. The method of claim 1, wherein determining a reduced number of possible symbol values for the sequence of symbols comprises identifying a reduced number of possible symbol values as candidate symbol values for each symbol or symbol block in the sequence of symbols.

10. The method of claim 9, wherein detecting the sequence of received symbols by processing the received signal in a sequence estimation process that is constrained to the reduced number of possible symbol values comprises:
limiting a state space for each symbol or symbol block in the sequence of symbols or symbol blocks based on the reduced number of possible symbol values identified for the symbol or symbol block; and
identifying final detected values for symbols or symbol blocks through a sequence of the limited state spaces.

11. A demodulator for detecting a sequence of symbols in a received signal comprising:

an initial demodulator configured to determine a reduced number of possible symbol values for the sequence of symbols by initially demodulating the received signal and detecting candidate symbol values for all or a subset of the sequence of symbols;
a sequence estimator configured to detect the sequence of received symbols by processing the received signal in a sequence estimation process that is constrained to the reduced number of possible symbol values; and
a control processor configured to evaluate at least one of channel dispersion and received signal quality, and to correspondingly select which one of two available types of initial demodulation processes is to be used by the initial demodulator for initially demodulating the received signal based on the evaluation, wherein the two available types of initial demodulation processes include a Rake-based demodulation process and a decision feedback equalization-based demodulation process.

12. The demodulator of claim 11, wherein the sequence estimator is configured to limit state spaces used for sequence estimation to the candidate symbol values as determined by the initial demodulator.

13. The demodulator of claim 11, wherein the initial demodulator is configured to detect the candidate symbol values for all or a subset of the sequence of symbols by identifying two or more candidate symbol values for each symbol or symbol block in the sequence of symbols.

14. The demodulator of claim 13, wherein the initial demodulator is configured to detect the two or more candidate symbol values by:
performing time-wise forward decision feedback equalization and corresponding symbol detection to produce a first symbol decision for each symbol or symbol block in the sequence of symbols;
performing time-wise backward decision feedback equalization and corresponding symbol detection to produce a second symbol decision for each symbol or symbol block in the sequence of symbols; and
setting the corresponding first and second symbol decisions as the two or more candidate symbol values for each symbol or symbol block in the sequence of symbols.

15. The demodulator of claim 13, wherein the initial demodulator is configured to detect the two or more candidate symbol values by:
performing Rake demodulation of the received signal to produce soft values for the sequence of symbols; and
evaluating the soft values to determine two or more candidate symbol values for each symbol or symbol block in the sequence of symbols.

16. The demodulator of claim 11, wherein the initial demodulator determines the reduced number of possible symbol values for the sequence of symbols by identifying a reduced number of possible symbol values for the sequence of symbols based on initially demodulating the received signal and detecting candidate symbol values for all or a subset of the sequence of symbols.

17. The demodulator of claim 16, wherein the sequence estimator is configured to detect the sequence of received symbols by:
constraining state spaces used in the sequence estimation process according to the reduced number of possible symbol values; and
detecting final symbol values for the sequence of symbols based on processing the received signal via the sequence estimation process.

18. The demodulator of claim 11, wherein the initial demodulator adapts the number of candidate symbol values detected for a given symbol or symbol block in the sequence of symbols as a function of a corresponding symbol detection reliability.

19. The demodulator of claim 11, wherein the initial demodulator determines the reduced number of possible symbol values by identifying a reduced number of possible symbol values for each symbol or symbol block in the sequence of symbols.

20. The demodulator of claim 19, wherein the sequence estimator detects the sequence of received symbols by:
- limiting a state space for each symbol or symbol block in the sequence of symbols based on the reduced number of possible symbol values identified for the symbol or symbol block; and
- identifying final detected symbols or symbol blocks through a sequence of the limited state spaces.

* * * * *

UNITED STATES PATENT AND TRADEMARK OFFICE
CERTIFICATE OF CORRECTION

PATENT NO. : 8,559,561 B2  
APPLICATION NO. : 12/035932  
DATED : October 15, 2013  
INVENTOR(S) : Bottomley Page 1 of 1

It is certified that error appears in the above-identified patent and that said Letters Patent is hereby corrected as shown below:

On the Title Page, in item (56), under "OTHER PUBLICATIONS", in Column 2, Line 8, delete "Co-peding" and insert -- Co-pending --, therefor.

On the Title Page, in item (56), under "OTHER PUBLICATIONS", in Column 2, Line 13, delete "Multliuser" and insert -- Multiuser --, therefor.

On the Title Page, in item (56), under "OTHER PUBLICATIONS", in Column 2, Line 15, delete "Comunications," and insert -- Communications, --, therefor.

On Title Page 2, in item (56), under "OTHER PUBLICATIONS", in Column 2, Line 20, delete "FeedforwardlFeedback" and insert -- Feedforward/Feedback --, therefor.

Signed and Sealed this  
Fifteenth Day of April, 2014

Michelle K. Lee  
*Deputy Director of the United States Patent and Trademark Office*